(12) United States Patent
Sachs et al.

(10) Patent No.: US 7,824,602 B2
(45) Date of Patent: Nov. 2, 2010

(54) CERAMIC PROCESSING AND SHAPED CERAMIC BODIES

(75) Inventors: Emanuel Sachs, Newton, MA (US); Alaric Naiman, Lincoln, MA (US); James Serdy, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 11/433,838

(22) Filed: May 12, 2006

(65) Prior Publication Data

US 2007/0228621 A1 Oct. 4, 2007

Related U.S. Application Data

(60) Provisional application No. 60/788,586, filed on Mar. 31, 2006.

(51) Int. Cl.
B28B 3/20 (2006.01)

(52) U.S. Cl. .................. 264/638; 264/464; 264/623; 264/634

(58) Field of Classification Search .......... 264/464, 264/623, 634, 638
See application file for complete search history.

(56) References Cited

U.S. PATENT DOCUMENTS

| | | |
|---|---|---|
| 2,872,724 A | 2/1959 | Conant |
| 2,968,622 A | 1/1961 | Whitehurst |
| 3,231,401 A | 1/1966 | Price et al. |
| 3,311,689 A | 3/1967 | Kelsey |
| 3,385,915 A | 5/1968 | Hamling |
| 3,626,049 A | 12/1971 | Yamamoto et al. |
| 3,632,709 A | 1/1972 | Hayes et al. |
| 3,652,749 A | 3/1972 | Sobel et al. |
| 3,663,182 A | 5/1972 | Hamling |
| 3,709,706 A | 1/1973 | Sowman |
| 3,736,160 A | 5/1973 | Hamling |
| 3,760,049 A | 9/1973 | Borer et al. |
| 3,793,041 A | 2/1974 | Sowman |
| 3,795,524 A | 3/1974 | Sowman |
| 3,846,527 A | 11/1974 | Winter et al. |
| 3,847,535 A | 11/1974 | Cahoon, Jr. et al. |
| 3,909,278 A | 9/1975 | Johnson |
| 3,935,060 A | 1/1976 | Blome et al. |
| 3,943,220 A | 3/1976 | Barnett et al. |
| 3,950,478 A | 4/1976 | Kenworthy et al. |
| 4,047,965 A | 9/1977 | Karst et al. |
| 4,071,594 A | 1/1978 | Pearson et al. |
| 4,089,921 A | 5/1978 | Dobo |
| 4,101,615 A | 7/1978 | Horikiri et al. |
| 4,118,534 A | 10/1978 | Stanley |
| 4,125,406 A | 11/1978 | Sowman |
| 4,125,407 A | 11/1978 | Ueno |
| 4,166,147 A | 8/1979 | Lange et al. |
| 4,217,399 A | 8/1980 | Dobo |
| 4,278,634 A | 7/1981 | Zwick et al. |
| 4,287,254 A | 9/1981 | Dobo |
| 4,312,670 A | 1/1982 | Colucci |
| 4,384,046 A | 5/1983 | Nakagami |
| 4,511,664 A | 4/1985 | Yamamoto |
| 4,547,420 A | 10/1985 | Krueger et al. |
| 4,559,191 A | 12/1985 | Arons |
| 4,668,717 A | 5/1987 | Lemstra et al. |
| 4,707,399 A | 11/1987 | Rambosek |
| 4,713,300 A | 12/1987 | Sowman et al. |
| 4,735,924 A | 4/1988 | Arons |
| 4,743,511 A | 5/1988 | Sowman et al. |
| 4,795,668 A | 1/1989 | Krueger et al. |
| 4,824,623 A | 4/1989 | Rambosek |
| 5,041,248 A | 8/1991 | Renlund et al. |
| 5,062,911 A | 11/1991 | Hampton et al. |
| 5,064,596 A * | 11/1991 | Chida et al. .................. 264/181 |
| 5,223,188 A | 6/1993 | Brundage et al. |
| 5,316,577 A | 5/1994 | Wu |
| 5,458,834 A | 10/1995 | Faber et al. |
| 5,520,869 A | 5/1996 | Taylor |
| 5,525,291 A | 6/1996 | St. Julien |

(Continued)

FOREIGN PATENT DOCUMENTS

DE 1964914 A 7/1970

(Continued)

OTHER PUBLICATIONS

Nath Das R. et al. "Rheological Studies on Cordierite Honeycomb Extrusion," *Journal of the European Ceramic Society* 2002, 22(16), 2893-2900.

(Continued)

*Primary Examiner*—Jason L Lazorcik
*Assistant Examiner*—Russell J Kemmerle, III
(74) *Attorney, Agent, or Firm*—Wolf, Greenfield & Sacks, P.C.

(57) ABSTRACT

The present invention relates to methods for the formation of ceramic bodies. Methods of the invention involve processing ceramic-forming compositions to form an integrally self-supporting or stabilized structure, which may then be sintered to give the full-density ceramic product. Methods of the invention may also involve densification of the ceramic body. In one set of embodiments, the volume of the integrally self-supporting structure is reduced by at least 20%. The present invention may produce ceramic bodies having greater strength and durability, since the ceramic-forming compositions may be low in viscosity and may be homogeneously blended, decreasing the possibility for defects.

60 Claims, No Drawings

U.S. PATENT DOCUMENTS

| | | | |
|---|---|---|---|
| 5,678,165 | A | 10/1997 | Wu |
| 5,767,218 | A | 6/1998 | Becker et al. |
| 5,770,652 | A | 6/1998 | Richards et al. |
| 5,797,081 | A | 8/1998 | Brundage et al. |
| 5,884,138 | A | 3/1999 | Chalasani et al. |
| 5,925,308 | A | 7/1999 | Fewkes et al. |
| 5,935,514 | A | 8/1999 | Ford, Jr. et al. |
| 5,966,582 | A | 10/1999 | Chalasani et al. |
| 6,080,345 | A | 6/2000 | Chalasani et al. |
| 6,113,829 | A | 9/2000 | Bookbinder et al. |
| 6,183,852 | B1 | 2/2001 | Rorabaugh et al. |
| 6,200,517 | B1 | 3/2001 | Peng et al. |
| 6,206,992 | B1 | 3/2001 | Baek et al. |
| 6,221,308 | B1 | 4/2001 | Peng |
| 6,287,510 | B1 | 9/2001 | Xun |
| 6,325,610 | B2 | 12/2001 | Chiu et al. |
| 6,355,338 | B1 | 3/2002 | Hilmas et al. |
| 6,372,033 | B1 | 4/2002 | Chalasani et al. |
| 6,514,610 | B2 | 2/2003 | Itoyama et al. |
| 6,555,031 | B2 | 4/2003 | Gadkaree et al. |
| 6,689,184 | B1 | 2/2004 | Morris |
| 2001/0004495 | A1 | 6/2001 | Itoyama et al. |
| 2002/0011683 | A1 | 1/2002 | Gadkaree et al. |
| 2002/0142148 | A1 | 10/2002 | Hilmas et al. |
| 2003/0044593 | A1 | 3/2003 | Vaidyanathan et al. |
| 2004/0028875 | A1 | 2/2004 | Van Rijn et al. |
| 2004/0079469 | A1 | 4/2004 | Chan et al. |
| 2004/0119209 | A1 | 6/2004 | Horn et al. |
| 2005/0074609 | A1 | 4/2005 | Veariel et al. |

FOREIGN PATENT DOCUMENTS

| | | |
|---|---|---|
| EP | 0 650 944 A1 | 5/1995 |
| EP | 0 764 616 A1 | 3/1997 |
| EP | 1 012 126 B1 | 6/2000 |
| WO | WO 99/10294 | 3/1999 |
| WO | WO 03/055593 A1 | 7/2003 |

OTHER PUBLICATIONS

Invitation to Pay Additional Fees (Partial International Search) dated Oct. 25, 2007 in PCT/US2007/007968.

International Search Report and Written Opinion from PCT/US2007/007968, filed Mar. 30, 2007, mailed Jun. 5, 2008.

* cited by examiner

CERAMIC PROCESSING AND SHAPED CERAMIC BODIES

RELATED APPLICATIONS

This application claims priority under 35 U.S.C. §119(e) to U.S. Provisional Application Ser. No. 60/788,586, entitled "Ceramic Processing," filed on Mar. 31, 2006, which is herein incorporated by reference in its entirety.

FIELD OF THE INVENTION

The present invention relates to methods for the formation of ceramic bodies.

BACKGROUND OF THE INVENTION

Much of ceramics processing utilizes fine powders in combination with organic additives to form a ceramic precursor known as a "green body," which is subsequently fired or sintered to give the final ceramic product. Typically, the green body contains a polymer binder which helps to maintain the structural integrity of the green body. When present in relatively high amounts, the polymer binder fills the void space between powder particles. The polymer binder is then removed or "burned out" and the structure is sintered to a full density component. Ceramic structures having simple geometries such as circular cross sections and complex geometries such as honeycomb structures have been manufactured.

One method for the fabrication of ceramic bodies is to formulate the ceramic-forming powders into a thick paste at very high solids loading, typically above 55% by volume, and to extrude the paste to form the green body. Most such pastes must possess at least 55% solid loading by volume to allow the extruded green body to maintain its shape and to be sintered to full density. However, extrusion of compositions having such high solid loading can present a number of technological challenges. First, the thick paste can be difficult to compound without the introduction of voids. Second, the thick paste can cause die clogging, i.e., it may not readily flow through a nozzle or extrusion die, making the process difficult to carry out and to control. Also, pressure increases caused by highly viscous pastes within the nozzle or extrusion die can generate wear on the apparatus.

The use of compositions having lower solid loading by volume results in slurries of lower viscosity and homogeneous consistency which could flow through a nozzle or extrusion die with very low probability of clogging. Also, such compositions are less likely to cause back pressure within the apparatus. However, upon exiting the nozzle, such slurries would likely immediately lose their shape, rather than retaining at least in part the shape of the die through which they were extruded, as their viscosity is typically not much greater than that of water. Further, the low starting density of such slurries may make it difficult to sinter the ceramic body to full density.

Accordingly, improved methods for the formation of ceramic structures are needed.

SUMMARY OF THE INVENTION

The present invention provides methods for making ceramic structures, and ceramic structures themselves. In many, but not all, embodiments, extrusion of a ceramic precursor is involved. One method comprises providing a ceramic precursor composition comprising a ceramic forming powder and a fluid carrier; extruding the fluidic composition through a nozzle to produce an extrudate; rapidly modifying the rheology of the extrudate upon exit from the nozzle substantially by treating the composition to increase its viscosity, so as to retain substantially the cross sectional shape of the extrusion nozzle and to create an integrally self-supporting structure; removing at least some of the fluid carrier and increasing the packing density of the ceramic powder thereby, and sintering the body to form the ceramic structure.

Another embodiment of the present invention provides a method for making a ceramic structure, comprising providing a fluidic ceramic precursor composition comprising a ceramic-forming powder having a solid loading of less than 55% by volume wherein the composition has a viscosity of less than 100,000 cP; passing the composition through an extrusion die to form a structure having a cross-sectional profile corresponding substantially to the cross-sectional profile of the die; and sintering the composition to form the ceramic structure.

Another embodiment of the present invention provides a method for making a ceramic structure, comprising providing a ceramic precursor composition comprising a ceramic-forming powder and at least one fluid carrier; extruding the composition through an extrusion die to form an integrally self-supporting structure having a cross-sectional profile corresponding substantially to the cross-sectional profile of the die, and having a shape; removing at least a portion of the fluid carrier such that the structure is reduced in volume by at least 20% while the shape of the structure is essentially maintained; and sintering the composition to form the ceramic structure.

Another embodiment of the present invention provides a method for making a ceramic structure, comprising providing a fluidic ceramic precursor composition comprising a ceramic-forming powder having a solid loading of less than 55% by volume; passing the composition through a die to form a structure having a cross-sectional profile corresponding substantially to the cross-sectional profile of the die; and sintering the composition to form the ceramic structure.

Another embodiment of the present invention provides a method for making a ceramic structure, comprising providing a fluidic ceramic precursor composition comprising a ceramic-forming powder wherein the composition has a viscosity of less than 100,000 cP; passing the composition through a die to form a structure having a cross-sectional profile corresponding substantially to the cross-sectional profile of the die; and sintering the composition to form the ceramic structure.

DETAILED DESCRIPTION

The present invention generally relates to methods for the formation of ceramic bodies, for example via extrusion. The invention involves processing relatively fluidic ceramic-forming compositions which may have relatively low solid loading by volume and whose properties may be advantageously altered (for example, stabilized) by rheology modification at any time during ceramic processing. The compositions may be extruded to form an integrally self-supporting structure having a cross-sectional profile corresponding substantially to the cross-sectional profile of the extrusion die. The extruded composition may then be further treated to afford the final ceramic product. Compositions of the invention can be homogeneous, fluidic compositions which are simple to formulate and process, reducing the potential for clogging or pressure increase within the extrusion die and extrusion nozzle. Methods of the invention may also result in ceramic bodies having greater strength and durability, since the fluidic ceramic-forming compositions are low in viscosity and may be homogeneously blended, decreasing the possibility for defects (e.g., air pockets, cracks) which may be found in structures processed from thicker, more viscous compositions or pastes.

As used herein, a structure having "a cross-sectional profile corresponding substantially to the cross-sectional profile of the extrusion die" refers to a structure which, upon extrusion through a die or nozzle, has a cross-sectional profile which is related to (e.g., resembles) the cross-sectional profile of the die or nozzle through which it was extruded. The die or nozzle may have any shape (e.g., circular, square, triangular, honeycomb, etc.) suited for a particular desired structure. In some cases, the structure may have a cross-sectional profile which is identical to that of the die or nozzle. For example, a composition extruded through a circular extrusion die may largely retain the shape of the extrusion die, resulting in a structure having a circular cross-sectional profile. In some cases, the extruded structure may possess a cross-sectional profile that slightly deviates from the cross-sectional profile of the die, but resembles or is, to a large extent, related to the cross-sectional profile of the die. For example, a composition extruded through a circular extrusion die may result in a structure having a slightly oval cross-sectional profile. Similarly, a composition extruded through a square extrusion die may result in a structure having altered (e.g., slightly depressed) walls but substantially retains the square cross-sectional profile of the die.

In one embodiment, the invention provides methods of making a ceramic or ceramic-containing structure in which a ceramic precursor composition is extruded through a die or nozzle in conjunction with rapid modification of the rheology of the extrudate, such that the cross-sectional shape of the extrusion die or nozzle is substantially maintained in an integrally self-supporting structure. The structure can be further treated as discussed more fully below. "Modifying the rheology," as used herein, means changing a characteristic of the ceramic precursor composition and/or extrudate such that the extrudate retains substantially the cross-sectional shape of the extrusion nozzle or die and allows the possibility of further treatment (e.g., sintering) to form a ceramic structure. In this way, the ceramic structure can have a shape that corresponds in some way to that of the nozzle or die. Rheology modification can take place before, during, or after passage through a nozzle or die, or other shaping technique. The final product can be somewhat different than the profile of the nozzle or die (e.g., smaller), but the rheology modification provided by the invention allows the final product to be similar or identical in some way to the shape of the nozzle or die (or other element used to shape the ceramic precursor). Rheology can be modified by temperature change, polymerization and/or cross-linking, or other treatment technique described herein or known in the art that typically results in an increase in viscosity of the material so treated. Where rheology is modified in accordance with the invention, a property or properties associated with the deformation and/or flow of the material so modified is generally altered.

As used herein, the terms "ceramic precursor composition" and "ceramic-forming composition" refer to compositions that, when appropriately treated (e.g., sintered), can form a full density ceramic structure or ceramic-containing structure. A ceramic precursor composition can have one or more different ceramic components. In some embodiments, the ceramic component may be in the form of particles. For example, the ceramic precursor composition may comprise at least one type of ceramic particle. In some cases, the ceramic precursor composition may comprise at least two types of ceramic particles. In some embodiments, the ceramic component may be in the form of a liquid precursor, including pre-ceramic polymers, suspensions and/or solutions (e.g., a solvent comprising dissolved matter, non-particulate liquids). It is also possible for one or more ceramic components to contain a metal, such that the resulting ceramic body may be a metal-ceramic composite (or cermet). In some cases, the metal may be a metal particulate.

The ceramic precursor composition may be a suspension, a solution, or a combination thereof. In some cases, the ceramic precursor composition possesses sufficient yield stress such that the composition may be capable of maintaining a shape without a container or without some modification of viscosity or rheology (e.g., a paste). In some cases, the ceramic precursor composition may possess essentially no yield stress and may be fluidic (e.g., slurries, and the like). The terms "fluidic ceramic precursor composition" and "fluidic ceramic-forming composition" may be used to describe such compositions that may not be capable of maintaining a shape without a container or without some modification of viscosity or rheology.

In one embodiment of the invention, a fluidic ceramic-forming composition comprising a ceramic-forming powder having a solid loading of less than 55% by volume, and with a viscosity of less than 100,000 cP, is passed through a die (e.g., an extrusion die) while it is essentially simultaneously treated to increase its viscosity. As used herein, the term "passing" may refer to extruding, pultruding, pulling, drawing, or other processes for passing a ceramic precursor composition through a nozzle or a dye to form an extrudate. As used herein, the term "viscosity" may be used to encompass various forms of viscosity. For example, in some embodiments (where indicated), viscosity refers specifically to Newtonian viscosity. In some embodiments the term viscosity refers to non-Newtonian behavior including the possibility of some yield stress.

In some embodiments, viscosity may be used to refer to the ability of a composition to retain a shape upon extrusion. In some embodiments, viscosity may be used to refer to the ability of a composition to flow upon shearing. The treating of the composition results in extrusion of an integrally self-supporting structure having a cross-sectional profile corresponding substantially to the cross-sectional profile of the die. Subsequent sintering of the extrudate can lead to formation of the final ceramic structure. Other embodiments may include additional steps, such as the removal of certain components of the integrally self-supporting structure, or reduction in the volume of the integrally self-supporting structure, prior to sintering. Such reduction in volume may be accompanied by an increase in the packing density of the solid material in the extrudate. In one embodiment, the ceramic precursor composition comprises a ceramic-forming powder and at least one fluid carrier and is extruded through an extrusion die to form an integrally self-supporting structure having a cross-sectional profile corresponding substantially to the cross-sectional profile of the die, and at least a portion of the fluid carrier is removed such that the structure is reduced in volume by at least 20%, and in some cases, by at least 50%, while the shape of the structure is essentially maintained. In some cases, the volume reduction can be even more substantial, for example, with the volume of the structure reduced by a factor of 3, 4 or 5. The resultant structure then is sintered to form a ceramic structure. In one embodiment, the integrally self-supporting structure is reduced in volume by at least 20% by removal of a fluid carrier, such as water, for example, resulting in an increase in the packing density of the solid ceramic-forming materials. In some embodiments, the packing density of the solid ceramic-forming materials may increase to at least 50%.

For example, a water-based slurry can have 20% by volume ceramic powder upon extrusion. The rheology of this extrudate can be modified by a chemically induced cross-linking upon exit from the extrusion nozzle. Some amount of removal of the fluid carrier (e.g., water) may take place during and as a result of the cross-linking operation. A drying operation may then be carried out, resulting in the progressive removal of the water, allowing the ceramic particles to be brought into closer proximity to each other by the capillary stress of the liquid. The particles may reach a maximum packing density, for example, when there are sufficient particle-particle contacts and other interactions to counter the compressive capillary stress. In some embodiments, the extrudate may reach a ceramic packing density of, for example, 60% by volume, and the volume of the extrudate may be reduced by approximately a factor of 3. In some cases, any further removal of the water from the interstitial spaces between ceramic particles (e.g., drying) may not result in substantial further densification of the ceramic particles. However, further densification may result from a firing operation (e.g., sintering).

In another embodiment, methods of the invention produce ceramic structures having improved shape retention. Typically, formed (e.g. extruded or pultruded) ceramic precursors, or green bodies, are susceptible to distortion prior to the final sintering step. Structures having complex geometries, such as cellular honeycombs, or other thin-wall substrates (i.e., 6 mil or less), may collapse or be otherwise deformed while in the form of a pre-sintered green body. In the case of ceramic-forming compositions having low viscosity, an untreated extrudate would typically lose its shape upon formation into a green body, for example, by extrusion. However, in the present invention, certain embodiments involve treatment to stabilize the green body to form an integrally self-supporting structure giving ceramic bodies with improved shape retention.

Embodiments of the invention are particularly useful for ceramic-forming compositions having low viscosities (e.g., fluidic compositions), which may lose their shape upon extrusion if not treated to form an integrally self-supporting structure. In some embodiments, methods of the invention comprise the use of ceramic-forming compositions having a solid loading of 55% or less by volume. In some embodiments, methods of the invention comprise the use of ceramic-forming compositions having a solid loading of 45% or less by volume. In other embodiments, the ceramic-forming compositions having a solid loading of 30% or less by volume. In other embodiments, the ceramic-forming compositions having a solid loading of 20% or less by volume. As used herein, the "solid loading" of the composition refers to the amount of ceramic-forming powders, or mixtures thereof, present in the composition (by volume). The solid loading may include solids which are present in dissolved form, or which are present as liquid precursors. Other components of the ceramic-forming composition may include fluid carriers, surfactants, deflocculants, coagulants, binders, lubricants, dispersants, plasticizers, cross-linking agents, and thickeners, etc.

The use of compositions having relatively low packing density, solid loading, and/or viscosity as described herein may be particularly advantageous for use in ceramic processing since they are relatively easy to formulate and process, and may reduce the potential for clogging and/or pressure increases within the extrusion apparatus. However, without treatment to stabilize (e.g., rigidify, form an integrally self-supporting structure of) such compositions, they may essentially immediately collapse upon extrusion. As described further below, the stabilization of compositions having relatively low packing density, solid loading, and/or viscosity can result in retention of the shape of the extruded structure. The stabilization may comprise rigidifying the extrudate, increasing the viscosity of the extrudate, and/or increasing the packing density of the extrudate.

In some embodiments, methods of the invention comprise the extrusion of ceramic-forming compositions having initial, pre-extrusion viscosities less than 100,000 cP while essentially simultaneously treating the composition to increase its viscosity. In other embodiments, the pre-extrusion viscosity may be less than 80,000 cP, less than 30,000cP, less than 10,000 cP, less than 5000 cP, less than 2500 cP, less than 1000cP, less than 500cP, less than 100cP, less 50cP, or even less 10cP. The composition may be treated either immediately prior to, during, and/or immediately upon extrusion, such that the cross-sectional profile of the die is maintained by the composition without time delay. In one embodiment, the ceramic-forming composition forms an integrally self-supporting structure immediately upon extrusion. As used herein, an "integrally self-supporting structure" is defined as a non-solid structure having sufficient stability or rigidity to maintain its structural integrity (e.g., shape) without external support along surfaces of the structure. That is, the extruded composition maintains the cross-sectional profile of the extrusion die without need for support by an external substrate, and need not become an integral part of any substrate. In some cases, the increased stability (e.g., rigidity) of the composition results from a modification in the rheology of the composition. The modification in rheology may be due to, for example, a change in temperature, a mechanical effect, exposure to electromagnetic radiation, exposure to a chemical (e.g., a chemical cross-linking agent), or the like, as described more fully below. In certain embodiments, the increased stability (e.g., rigidity) of the composition results from an increase in the viscosity of the composition.

In one embodiment, the increased stability of the composition results from transformation of the composition into a gel. As used herein, a "gel" is defined as a three-dimensional network formed from the combination of a fluid component and a binder component, wherein a solid, jelly-like structure is formed. In some embodiments, formation of the integrally self-supporting structure comprises a change (e.g., increase in viscosity, gelling, or hardening) occurring substantially uniformly throughout the cross-section of the structure (e.g., bulk-hardening). In other embodiments, formation of the integrally self-supporting structure comprises a change occurring predominantly at or near the surface of the structure (e.g., case-hardening), or other non-homogenous hardening. A variety of hardening techniques, and hardening profiles (homogenous or non-uniform, e.g. case hardening), can be involved.

The integrally self-supporting structure may be further treated to remove one or more components of the composition prior to sintering. In certain embodiments, the ceramic-forming composition may be extruded and may form an integrally self-supporting structure as described above having a certain volume, wherein subsequent removal of a component, such as a fluid carrier, results in a change (e.g., decrease) in the volume of the integrally self-supporting structure, which may result in an increase in viscosity and a self-supporting structure. In one embodiment, at least a portion of the fluid carrier is removed by evaporation. In another embodiment, the fluid carrier is removed by treatment (e.g., rinsing, washing, or immersion) of the integrally self-supporting structure with a solvent, such as a solvent in which the fluid carrier is soluble. In another embodiment, formation of the integrally self-supporting structure (e.g., modification of the rheology of the extrudate) and removal of at least some of the fluid carrier occur simultaneously. For example, a portion of the fluid carrier may be removed by syneresis, wherein exudation of the fluid carrier occurs as a result of the gelation of the ceramic-forming composition to form the integrally self-supporting structure. In another embodiment, removal of at least some of the fluid carrier may occur after the formation of the integrally self-supporting structure.

In the present invention, removal of the fluid carrier from the integrally self-supporting structure (e.g., by syneresis and/or drying of the extrudate) can result in a significant increase in the packing density of the ceramic-forming solids. For example, a composition containing a relatively low (e.g., less than 30%) amount of ceramic-forming solid may be extruded and then dried prior to sintering to obtain a structure having a packing density of about 40% or higher. In one embodiment, the packing density reaches at least 50% upon removal of the fluid carrier. In one embodiment, the packing density reaches 60% upon removal of the fluid carrier. This increase in packing density allows for the formation of highly rigid, ceramic structures from ceramic-forming compositions having relatively low packing density and viscosity. As mentioned above, such compositions are relatively easy to formulate and reduce the potential for clogging and/or pressure increases within the extrusion apparatus.

The fluid carrier can be removed such that the volume of the integrally self-supporting structure is reduced by at least 20%, 35%, or even at least 50%. The reduction of volume can be achieved with relatively low perturbation of the integrally self-supporting structure. That is, the removal of the fluid carrier may occur sufficiently homogenously throughout the structure, such that the shape of the extrudate prior to drying is retained. This may be advantageous, for example, for producing ceramic structures having relatively small diameter (e.g., less than 0.5 mm), such as ceramic fibers or filaments, structures having thin walls, or other ceramic structures that may be difficult to obtain using more densely packed and/or more viscous ceramic-forming compositions, as described further below.

In another embodiment, the volume of the integrally self-supporting structure is further reduced by sintering. Such sintering may comprise solid-state sintering, liquid-phase sintering, viscous-phase sintering, or combinations thereof. In some embodiments, the ceramic precursor (e.g., fluid ceramic precursor) can contain at least two different components (e.g., ceramic and/or metallic components) having different behavior at a given sintering temperature.

In other embodiments, methods of the invention comprise the extrusion of a ceramic precursor composition which, prior to extrusion, may form a first integrally self-supporting structure. Disruption of the first integrally self-supporting structure by shearing, for example, or other external forces, may lower its viscosity to allow forming of the composition by, for example, extrusion through an extrusion die. Examples of such compositions include, but are not limited to, Bingham plastics (i.e., materials which may not flow without disruption by an external force such as shearing) and thixotropic fluids (i.e. fluids wherein the viscosity decreases as shear rate increases). Upon extrusion of the composition and removal of the disruptive, external force (e.g., shearing), the composition may then form a second integrally self-supporting structure, which may have a cross-sectional profile corresponding substantially to the cross-sectional profile of the die through which the composition was extruded. In some embodiments, the second integrally self-supporting structure may be formed spontaneously, without need for additional treatment (e.g., reversible Bingham-plastics, reversibly thixotropic fluids). In other embodiments, the second integrally self-supporting structure may be formed by treatment of the composition to increase its viscosity, as described herein.

In some embodiments, methods of invention may further comprise coating the ceramic body with one or more layers of a material. The coating may be performed at any stage of the method, such as after the formation of the integrally self-supporting structure, after the removal of at least a portion of the fluid carrier, or after the formation of the ceramic structure by sintering. In one embodiment, coating of the ceramic body is performed after the formation of the integrally self-supporting structure and before removal of at least a portion of the fluid carrier. In one embodiment, coating of the ceramic body is performed after the removal of at least a portion of the fluid carrier and before sintering. In another embodiment, coating of the ceramic body is performed after a first sintering step and before a second sintering step.

Those of ordinary skill in the art may select the appropriate techniques for coating. For example, coating methods that may be used after the formation of the ceramic structure by sintering include, but are not limited to, dipping, spraying, plating, evaporating and other vacuum techniques. In one embodiment, the coating is applied to the ceramic body (e.g., after formation of the integrally self-supporting structure or after the removal of at least a portion of the fluid carrier) as a slurry or paste comprising ceramic and/or metallic particles. Such coatings can, in some cases, be sintered or fired to result in partial or full densification of the coating. This may be particularly advantageous, as the ceramic body can then be fired and densified simultaneously, minimizing internal stress and the potential for cracking. In some embodiments, the coating may be applied to the surface of an extrudate by extrusion into a bath comprising coating material. For example, a filament formed by extrusion may be coated by passing the filament through a bath of a slurry comprising coating material immediately upon extrusion.

The coating may be of a material that is different from that of the underlying ceramic body. Alternatively, the coating may be of the same or similar material, but with different grain size or other properties, for example. Multiple coatings can be performed to accomplish a grading between the material of the underlying ceramic body and the outer coating layer, so as to minimize cracking or other mechanical failure.

Although various specific embodiments of the invention are described, those of ordinary skill in the art will recognize that the invention as claimed embraces a variety of different embodiments which those of ordinary skill in the art would easily be able to perform upon the teachings found herein.

In one embodiment, methods of the invention are useful for forming ceramic products having simple cross-sectional profiles, such as circular cross-sections or other symmetrical cross-sections. One embodiment provides a method for the formation of structures having circular cross-sectional profiles of relatively small diameter (e.g., less than 0.5 mm), such as ceramic fibers or filaments. One particular embodiment of the invention involves the formation of continuous lengths (thousands of feet) of ceramic fiber. Other embodiments involve the formation of ceramic ribbons, tapes, and films. Additionally, methods of the invention may be useful for forming ceramic structures which are more complex and/or fragile, such as porous solids, structured fibers, cellular honeycombs, structures comprising a multiplicity of sub-structures, such as bundles, yarns, core-shells, or other composite structures, and the like. In one embodiment, a ceramic structure comprising thin-walls (i.e., 6 mil or less) is formed. In another embodiment, the rapid stabilization (e.g. formation of an integrally self-supporting structure) of the extrudate facilitates the stabilization of such complex structures, resulting in greater shape retention of the green body.

The ceramic-forming compositions may comprise at least one ceramic or ceramic-forming powder which can be any material that, when appropriately treated (e.g., sintered), can form a full density ceramic structure. Examples of such materials include cordierite, mullite, talc, clay, zircon, zirconia, spinel, aluminas, silicas, silicates, aluminates, lithium aluminosilicates, feldspar, titania, fused silica, nitrides, carbides, borides, precursors thereof, and/or mixtures thereof. The ceramic-forming composition may also comprise a liquid precursor. Examples include, but are not limited to, solutions of sodium silicate and polycarbosilazane precursors to silicon carbide.

In some embodiments, the ceramic-forming composition comprises at least one binder component. The binder may be any material that is capable of stabilizing or rigidifying (e.g., modifying the rheology of, e.g. increasing the viscosity of) the composition to form an integrally self-supporting structure. Materials which may be used as binders include, but are not limited to, polymers (e.g., pre-ceramic polymers), oligomers, monomers, solvents, non-solvents, ions, and the like. Examples of binders include polyvinylalcohol, polyvinylacetate, polystyrene, polypropylene, polysaccharides (e.g., Carrageenan), plant-derived colloids, cellulose ethers and related polymers, Agar, plant gums, gelatin, and/or combinations thereof. Stabilization of the composition may occur by any chemical or physical means, including photochemical, thermal, mechanical, or other means. In certain embodiments, the binder can be a single polymer or mixture of polymers. In other embodiments, the binder may be contained partially in other system components, including ceramic or pre-ceramic ingredients.

In one embodiment, the integrally self-supporting structure is formed by chemical means, i.e. chemical treatment of the composition just prior to, during, and/or after extrusion can result in an increase in viscosity of the composition. For example, the ceramic-forming composition may contain a binder which can be chemically treated (e.g., polymerized and/or cross-linked) to form covalent bonds (e.g. carbon-carbon, carbon-oxygen, oxygen-silicon, sulfur-sulfur, phosphorus-nitrogen, carbon-nitrogen, metal-oxygen or other covalent bonds), ionic bonds, hydrogen bonds (e.g., between hydroxyl, amine, carboxyl, thiol and/or similar functional groups, for example), dative bonds (e.g. complexation or chelation between metal ions and monodentate or multidentate ligands), or otherwise treated to cause a chemical reaction resulting in an increase in viscosity. Such chemical treatment can be carried out by the application of heat, radiation, and/or other means. Those of ordinary skill in the art are aware of and/or able to devise techniques useful for such treatment.

In certain embodiments, the integrally self-supporting structure is formed by the cross-linking of one or more components of the ceramic-forming composition. For example, cross-linking may occur between binder components of the composition. In one embodiment, cross-linking occurs by the polymerization of a functional monomer present in the composition. The polymerization may be carried out by means known to those of ordinary skill in the art, including anionic, cationic, radical, condensation, addition, ring-opening, ring-closing polymerization, any combination, or the like. In some embodiments, the polymerization occurs spontaneously. In other embodiments, polymerization occurs upon exposure to electromagnetic radiation. In another embodiment, polymerization occurs upon a change in temperature.

In other embodiments, cross-linking occurs between polymers within the composition to form the integrally self-supporting structure. For example, bonds between polymer chains may be formed as described above. In certain embodiments, cross-linking of polymers occurs by a change in the chemical environment, such as an adjustment of pH, ion concentration, solvent concentration, and/or fluid carrier concentration, the addition of a chemical component, and the like. In one embodiment, cross-linking between polymer chains is achieved by complexation between metal ions and polymers. In another embodiment, cross-linking occurs by adjustment (e.g., increasing or decreasing) of pH. In one embodiment, cross-linking may occur between charged moieties within an amphoteric polymer or mixtures thereof, such that negatively-charged moieties within a polymer may form ionic bonds with positively-charged moieties within another polymer. In another embodiment, cross-linking occurs from the addition of at least one fluid carrier. In one embodiment, the addition of at least one fluid carrier results in the cross-linking between the fluid carrier and the polymer, forming a gel.

In another embodiment, the integrally self-supporting structure is formed by thermal means. In certain embodiments, the integrally self-supporting structure is formed by heating and/or cooling. In other embodiments, the integrally self-supporting structure is formed by conduction and/or convection, e.g. via contact with a heated gas, liquid or surface. In other embodiments, the integrally self-supporting structure is formed upon exposure to electromagnetic radiation, e.g. ultraviolet, electron-beam, gamma, x-ray, infrared, radio frequency, and/or microwave etc. In some embodiments, the integrally self-supporting structure is formed by mechanical effects, e.g. mixing, shear, shock, and/or vibration.

In one embodiment, the integrally self-supporting structure is formed by a change in phase, for example, between a mesophase (e.g., liquid crystal phase) and a liquid, a mesophase and a solid, and/or between multiple mesophases.

In another embodiment, the integrally self-supporting structure is formed by phase separation between, for example, hydrophilic and hydrophobic moieties. In one embodiment, the integrally self-supporting structure is formed by the microscale phase separation of selected moieties of a polymer, for example.

In some embodiments, the ceramic-forming composition comprises at least one fluid carrier. The fluid carrier may serve to enhance the plasticity of the composition and/or lower the viscosity. In one embodiment, the fluid carrier may be organic, including polar and nonpolar organics, such as hydrocarbons, ketones, oils, alcohols, etc., and/or combinations thereof. In other embodiments, the fluid carrier is aqueous, such as water, other solvents miscible with water, or aqueous solutions of dissolved salts, such as metal carbonates, metal bicarbonates, metal sulfates, metal nitrates, metal halides, and the like.

In other embodiments, additional components of the ceramic-forming composition may include a surfactant. The surfactant may serve to promote adhesion between immiscible solvents (e.g. emulsify), as well as to homogeneously disperse the ceramic precursor solids. Examples of surfactants that can be used in the present invention include fatty acids, fatty esters, fatty alcohols, derivatives thereof, and combinations thereof.

Additional components which may enhance the processability of the ceramic-forming composition are known to those of ordinary skill in the art and may also be included in compositions of the invention, such as deflocculants, coagulants, binders, lubricants, dispersants, plasticizers, cross-linking agents (e.g., sodium tetraborate, ammonium tetraborate, Boric acid), thickeners, and the like.

The ceramic-forming composition may be molded or shaped by methods known to those of ordinary skill in the art, such as extrusion, injection molding, slip casting, centrifugal casting, pressure casting, dry pressing, or the like. The composition may be delivered through a shaping element such as a jet, nozzle, spinneret, die, form, roll, or the like. The shaping element may have simple or complex shape to produce a structure having a desired cross-sectional profile, optional including voids, cavities, grids, trabeculae, etc. In one embodiment, the composition is delivered in a direction that is counter to the direction of flow of an external bath or stream of liquid and/or gas. In another embodiment, the composition is delivered in the same direction as the flow of an external bath or stream of liquid and/or gas. The extruded material can be further modified by stretching, shaping, passing through dies or rollers, or otherwise manipulated to control size, shape, and/or internal material properties.

In one embodiment, the ceramic-forming composition may be treated immediately upon extrusion through an extrusion die to form an integrally self-supporting structure. For example, upon extrusion, the composition may come into contact with an environment, such as a chemical solution or a gas or vapor chamber, to which one or more components of the composition is chemically reactive. In one embodiment, the extrusion nozzle is submerged within a solution containing a chemical cross-linking agent such that, upon extrusion of a ceramic-forming composition, one or more of the components of the composition, such as a binder, reacts with the cross-linking agent to form covalent bonds (or other bonds such as ionic bonds, hydrogen bonds or the like) between binder components, producing an integrally self-supporting structure. In one specific embodiment, the ceramic-forming composition comprising a polymer binder capable of cross-linking is extruded through an extrusion die having a circular cross-sectional profile into a solution of chemical cross-linking agent to produce an integrally self-supporting structure in the form of a rubbery filament.

In another embodiment, the integrally self-supporting structure is formed by removal of at least a portion of fluid carrier (e.g., solvent extraction). The ceramic precursor composition, prior to passing through the die, may comprise a first fluid carrier. Upon passing through the die, the ceramic precursor composition may be immersed in a second fluid carrier, wherein the first fluid carrier is soluble with respect to the second fluid carrier. Such that the second fluid carrier substantially removes the first fluid carrier from the composition.

For example, the fluid ceramic precursor may comprise a polymer and a fluid "A" in which it is soluble. The fluid ceramic precursor may be extruded into a bath of a fluid "B" in which fluid "A" is soluble, but the polymer is not. Upon contact of the extrudate and fluid "B", fluid "A" will rapidly diffuse into fluid "B" leaving the polymer behind to act as a binder. In this embodiment, some or all of the densification of the extruded "body" may be accomplished substantially simultaneously with the formation of the integrally self-supporting structure. The degree of densification can be controlled by the length of time of exposure to solvent "B." Alternatively, the degree of densification can be controlled by the presence in the fluidic ceramic precursor of an additional fluid in which the polymer is soluble, but which is not soluble in fluid "B".

In some embodiments, the integrally self-supporting structure may be formed by gelation of the ceramic precursor composition (e.g., fluidic ceramic precursor composition), wherein at least a portion of fluid carrier is removed by syneresis.

The integrally self-supporting structure may be fired or sintered by methods known to those of ordinary skill in the art to form the full-density ceramic product. Upon sintering of the composition to form a ceramic structure, the structure may be optionally further treated. For example, the surface and/or bulk properties of the ceramic structure can be modified by heating, cooling, exposure to chemicals and/or electromagnetic radiation, treatment by calcination in one or more stages, etc. Additionally, the ceramic structure may be permeated or imbibed with a gas or liquid. Examples of post-sintering treatment include flame-spray, plasma, or chemical vapor deposition, and/or other methods.

In some embodiments, methods of the invention may be performed as a continuous process. For example, the continuous process may involve formation of an extrudate in the shape of a fiber or string as described herein, where the fiber or string is guided by rollers and pulleys as it travels through a cross-linking environment and then through successive drying and firing environments. As the extrudate may exhibit different properties at different extrusion speeds, the process may be tailored to suit a particular desired ceramic product. In one embodiment, the method may further comprise the use of a small diameter wire or filament to guide the ceramic body through the continuous process. The wire or filament may be threaded through a series of rollers and pulleys, and may be incorporated into the continuous process on the exiting side of the extrusion nozzle or, alternatively, threaded into the extrusion nozzle itself. The extrusion process can then be initiated and, either simultaneously or with a very small delay, the wire or filament can be withdrawn at a speed essentially equal to that of the extrudate. The cross-linked extrudate can either chemically bond to the surface of the wire or mechanically interlock with it so that it will follow the "leader" and thread through the apparatus.

While the invention has been described as being practiced by extrusion, other forming methods might be applicable including rolling and pultrusion as will be evident to those skilled in the art.

EXAMPLE

A ceramic-forming composition comprising one or more ceramic powder, dispersing agents and polyvinyl alcohol (PVA), a polymer capable of cross-linking, as the binder, is loaded into an extrusion apparatus wherein the exit of the extrusion die is submerged in a bath of ammonium tetraborate, a cross-linking agent for PVA. Other chemical agents can be used to modify the rheology of PVA as known in the art, including chemical agents for inorganic esterification, organic esterification, etherification, acetalization, and other cross-linking agents. A typical composition is 30% by volume ceramic powder in the particle size range of 1-3 microns, 60% by volume water, 4% PVA, and the remainder dispersant and low molecular weight polymers added to increase the flowability of the slurry. The composition is extruded through the extrusion die at speeds of approximately 1 meter/second directly into the bath of cross-linking agent. Extrusion takes place through an orifice of approximately 400 micron diameter which is submerged in a bath of ammonium tetraborate dissolved in water at room temperature. The PVA is cross-linked as the composition is extruded, forming a self-supporting, jelly-like fiber. Typically, with the extrudate moving at approximately 1 meter/second, an exposure length to the cross-linking agent of just of 3-5 cm is sufficient to lock the extrudate into a circular cross-section and to impart sufficient strength to the fiber to allow it to be lifted from the bath of cross-linking agent and handled. The extrudate has sufficient strength at this stage to be wound on a spool or to traverse through a set of pulleys and rollers so as to allow it to dry. Depending on the operating parameters, some amount of fluid carrier may be removed by syneresis of the cross-linked PVA. Typically, the extrudate stretches upon removal from the cross-linking bath with the result that the diameter of the extrudate decreases from the diameter immediately after cross-linking. The extrudate is dried with either room temperature or warm air and, as the extrudate dries, the ceramic particles are drawn together. This motion is possible because the crosslinked or gelled extrudate is not very rigid and thus, interparticle motion can be accommodated. If the ceramic particles are well-dispersed, such drying can result in very significant increases in packing density of the ceramic powder, quite readily into the range of 40-60%. The dried and extrudate is then sintered to form a ceramic product having a shape similar to or essentially identical to the extrudate.

This invention is not limited in its application to the details of construction and the arrangement of components set forth in the description. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for making a ceramic or ceramic containing structure comprising:
   providing a ceramic precursor composition comprising a ceramic forming powder and a fluid carrier wherein the composition has a viscosity of less than 10,000 cP;
   extruding the fluidic composition through a nozzle to produce an extrudate;
   modifying the rheology of the extrudate upon exit from the nozzle by exposing the extrudate to a chemical cross-linking agent to increase its viscosity, so as to retain substantially the cross sectional shape of the extrusion nozzle and to create an integrally self-supporting structure;
   removing at least some of the fluid carrier and increasing the packing density of the ceramic powder thereby, and sintering the body to form the ceramic structure.

2. A method as in claim 1, wherein the ceramic precursor composition further comprises a binder.

3. A method as in claim 2, wherein the binder is a polymer.

4. A method as in claim 1, wherein, upon removal of at least some of the fluid carrier, the packing density is at least 50%.

5. A method as in claim 1, wherein the fluidic ceramic precursor comprises at least one type of ceramic particle.

6. A method as in claim 1, wherein the fluidic ceramic precursor comprises at least two types of ceramic particles.

7. A method as in claim 1, wherein the fluidic ceramic precursor comprises a metal particulate.

8. A method as in claim 1, wherein the removing at least some of the fluid carrier comprises evaporation of the fluid carrier.

9. A method as in claim 1, wherein the removing at least some of the fluid carrier comprises extraction of the fluid carrier using a fluid in which the fluid carrier is soluble.

10. A method as in claim 1, wherein modifying the rheology of the extrudate and removing at least some of the fluid carrier occur essentially simultaneously.

11. A method as in claim 1, wherein the composition has a viscosity of less than 1,000 cP.

12. A method as in claim 1, wherein a portion of the fluid carrier is removed by syneresis.

13. A method as in claim 1, wherein the body is sintered to form a full density ceramic structure.

14. A method as in claim 1, wherein the nozzle is submerged within a solution containing the chemical cross-linking agent.

15. A method as in claim 1, wherein composition comprises a ceramic precursor composition having a solid loading of 30% by volume and 4% binder by volume.

16. A method as in claim 1, wherein the step of modifying comprises formation of a gel.

17. A method for making a ceramic structure, comprising:
   providing a fluidic ceramic precursor composition comprising a ceramic-forming powder having a solid loading of less than 45% by volume;
   passing the composition through a die while essentially simultaneously exposing the composition to a chemical cross-linking agent to increase its viscosity to form a structure having a cross-sectional profile corresponding substantially to the cross-sectional profile of the die; and
   sintering the composition to form the ceramic structure.

18. A method as in claim 17, wherein the fluidic ceramic precursor composition has a viscosity of less than 10,000 cP.

19. A method as in claim 18, wherein the fluidic ceramic precursor composition comprises a fluid and a portion of the fluid is removed by syneresis.

20. A method as in claim 17, wherein the composition further comprises fluid carriers, surfactants, deflocculants, coagulants, binders, lubricants, dispersants, plasticizers, cross-linking agents, and/or thickeners.

21. A method as in claim 17, the composition having a solid loading of 30% or less by volume.

22. A method as in claim 17, the composition having a solid loading of 20% or less by volume.

23. A method as in claim 17, wherein the passing is performed at a speed of at least 1 meter/second.

24. A method as in claim 17, wherein the cross-sectional profile of the die is round.

25. A method as in claim 24, wherein the cross-sectional profile of the die is less than 0.5 mm in diameter.

26. A method as in claim 17, wherein the composition, prior to passing through the die, has a viscosity of less than 1,000 cP.

27. A method as in claim 17, wherein the composition, prior to passing through the die, has a viscosity of less than 100 cP.

28. A method as in claim 17, wherein the composition, prior to passing through the die, has a viscosity of less than 10 cP.

29. A method as in claim 17, wherein the composition, prior to passing through the die, comprises a first fluid carrier, and, upon passing through the die, is immersed in a second fluid carrier such that the second fluid carrier substantially removes the first fluid carrier from the composition.

30. A method as in claim 17, wherein the passing comprises extruding the composition through an extrusion die.

31. A method as in claim 17, wherein the passing comprises pultruding the composition through an extrusion die.

32. A method as in claim 17, further comprising:
removing at least a portion of a fluid from the fluidic ceramic precursor composition such that the structure is reduced in volume by at least 20% while the shape of the structure is essentially maintained.

33. A method as in claim 32, wherein the fluid carrier is water.

34. A method as in claim 32, wherein the fluid carrier is organic.

35. A method as in claim 32, wherein the packing density of the ceramic powder increases upon removal of the fluid carrier.

36. A method as in claim 32, wherein the packing density of the ceramic powder increases to 60% upon removal of the fluid carrier.

37. A method as in claim 32, wherein the packing density of the ceramic powder increases to 40% upon removal of the fluid carrier.

38. A method as in claim 17, wherein the fluidic ceramic precursor composition comprises a fluid and a portion of the fluid is removed by syneresis.

39. A method as in claim 17, wherein the body is sintered to form a full density ceramic structure.

40. A method as in claim 17, wherein the die is submerged within a solution containing the chemical cross-linking agent.

41. A method for making a ceramic structure, comprising:
providing a fluidic ceramic precursor composition comprising a ceramic-forming powder wherein the composition has a viscosity of less than 10,000 cP;
passing the composition through a die while essentially simultaneously exposing the composition to a chemical cross-linking agent to increase its viscosity to form a structure having a cross-sectional profile corresponding substantially to the cross-sectional profile of the die; and
sintering the composition to form the ceramic structure.

42. A method as in claim 41, wherein the fluidic ceramic precursor composition comprises a fluid and a portion of the fluid is removed by syneresis.

43. A method as in claim 41, wherein the composition further comprises fluid carriers, surfactants, deflocculants, coagulants, binders, lubricants, dispersants, plasticizers, cross-linking agents, and/or thickeners.

44. A method as in claim 41, the composition having a solid loading of 30% or less by volume.

45. A method as in claim 41, the composition having a solid loading of 20% or less by volume.

46. A method as in claim 41, wherein the extruding is performed at a speed of at least 1 meter/second.

47. A method as in claim 41, wherein the cross-sectional profile of the die is round.

48. A method as in claim 41, wherein the cross-sectional profile of the die is less than 0.5 mm in diameter.

49. A method as in claim 41, wherein the composition, prior to passing through the die, has a viscosity of less than 1,000 cP.

50. A method as in claim 41, wherein the composition, prior to passing through the die, has a viscosity of less than 100 cP.

51. A method as in claim 41, wherein the composition, prior to passing through the die, has a viscosity of less than 10 cP.

52. A method as in claim 41, wherein the composition, prior to passing through the die, comprises a first fluid carrier, and, upon passing through the die, is immersed in a second fluid carrier such that the second fluid carrier substantially removes the first fluid carrier from the composition.

53. A method as in claim 52, wherein the packing density of the ceramic powder increases upon removal of the portion of the fluid.

54. A method as in claim 53, wherein the packing density of the ceramic powder increases to 40% upon removal of the fluid carrier.

55. A method as in claim 53, wherein the packing density of the ceramic powder increases to 60% upon removal of the fluid carrier.

56. A method as in claim 55, wherein increasing the viscosity of the composition and removing at least some of the fluid carrier occur essentially simultaneously.

57. A method as in claim 41, further comprising:
removing at least a portion of a fluid from the fluidic ceramic precursor composition such that the structure is reduced in volume by at least 20% while the shape of the structure is essentially maintained.

58. A method as in claim 41, wherein the body is sintered to form a full density ceramic structure.

59. A method as in claim 41, wherein the die is submerged within a solution containing the chemical cross-linking agent.

60. A method for making a ceramic or ceramic containing structure comprising:
providing a ceramic precursor composition comprising a ceramic forming powder and a fluid carrier wherein the composition has a viscosity of less than 10,000 cP and a solid loading of less than 45% by volume;
extruding the fluidic composition through a nozzle to produce an extrudate;
modifying the rheology of the extrudate upon exit from the nozzle by chemical treatment of the extrudate to increase its viscosity, so as to retain substantially the cross sectional shape of the extrusion nozzle and to create an integrally self-supporting structure;
removing at least some of the fluid carrier and increasing the packing density of the ceramic powder thereby, and
sintering the body to form the ceramic structure.

* * * * *